US010823159B2

(12) United States Patent
Ting

(10) Patent No.: US 10,823,159 B2
(45) Date of Patent: Nov. 3, 2020

(54) SYSTEM FOR HIGH PRESSURE, HIGH SHEAR PROCESSING OF FLUIDS

(71) Applicant: PRESSURE BIOSCIENCES, INC., South Easton, MA (US)

(72) Inventor: Edmund Y. Ting, Kent, WA (US)

(73) Assignee: PRESSURE BIOSCIENCES, INC., South Easton, MA (US)

(*) Notice: Subject to any disclaimer, the term of this patent is extended or adjusted under 35 U.S.C. 154(b) by 270 days.

(21) Appl. No.: 15/562,146

(22) PCT Filed: Mar. 28, 2016

(86) PCT No.: PCT/US2016/024452
§ 371 (c)(1),
(2) Date: Sep. 27, 2017

(87) PCT Pub. No.: WO2016/160667
PCT Pub. Date: Oct. 6, 2016

(65) Prior Publication Data
US 2018/0080444 A1 Mar. 22, 2018

Related U.S. Application Data

(60) Provisional application No. 62/139,706, filed on Mar. 28, 2015.

(51) Int. Cl.
F04B 9/117 (2006.01)
F04B 15/02 (2006.01)
(Continued)

(52) U.S. Cl.
CPC ............ F04B 9/1176 (2013.01); A23L 3/015 (2013.01); F04B 9/113 (2013.01); F04B 9/1172 (2013.01);
(Continued)

(58) Field of Classification Search
CPC ....... F04B 9/1172; F04B 9/1178; F04B 9/113; F04B 15/02; F04B 9/1176; A23L 3/015; F15B 3/00
See application file for complete search history.

(56) References Cited

U.S. PATENT DOCUMENTS 3,405,522 A * 10/1968 Tamaki ................ F01L 25/08
60/456
4,021,156 A * 5/1977 Fuchs, Jr. ............ F01L 25/063
417/346

(Continued)

FOREIGN PATENT DOCUMENTS

WO 2009023927 A1 2/2009

OTHER PUBLICATIONS

Diels, A. M. J., Wuytack, E. Y., and Michiels, C. W., "Modelling inactivation of *Staphylococcus aureus* and Yersinia enterocolitica by high-pressure homogenisation at different temperatures", International Journal of Food Microbiology, 87, pp. 55-62 (2003); DOI: 10.1016/S0168-1605(03)00050-3.

(Continued)

Primary Examiner — Peter J Bertheaud
(74) Attorney, Agent, or Firm — Lando & Anastasi, LLP

(57) ABSTRACT

A method for high fluid shear processing of a fluid uses an isolator that has a first sub-chamber for containing a first fluid and a second sub-chamber for containing a second fluid defined by a separator positioned in the chamber and movable between a first end of the chamber and a second end of the chamber. The two sub-chambers are in pressure communication with each other but are not in fluid communication with each other. A first fluid is pumped at an ultrahigh pressure into the first-sub chamber, and the pressure in the first sub-chamber causes a second fluid to be processed to be discharged from the second sub-chamber into a processing (Continued)

valve. A system is also provided for performing the steps of this method.

18 Claims, 7 Drawing Sheets

(51) Int. Cl.
*F04B 9/113* (2006.01)
*A23L 3/015* (2006.01)
*F15B 3/00* (2006.01)
*F04B 37/12* (2006.01)
*F04B 19/22* (2006.01)

(52) U.S. Cl.
CPC ............ *F04B 9/1178* (2013.01); *F04B 15/02* (2013.01); *F15B 3/00* (2013.01); *A23L 3/0155* (2013.01); *F04B 19/22* (2013.01); *F04B 37/12* (2013.01)

(56) References Cited

U.S. PATENT DOCUMENTS

| | | | |
|---|---|---|---|
| 4,074,858 A | 2/1978 | Burns et al. | |
| 4,123,204 A | 10/1978 | Scholle | |
| 4,543,044 A * | 9/1985 | Simmons | F04B 9/1176 417/342 |
| 4,924,671 A * | 5/1990 | Reinert | B30B 15/16 417/265 |
| 5,184,434 A * | 2/1993 | Hollinger | B24C 7/0007 451/36 |
| 5,232,726 A | 8/1993 | Clark et al. | |
| 5,634,773 A * | 6/1997 | Tanino | F04B 9/1178 417/46 |
| 5,769,614 A * | 6/1998 | Karasawa | F04B 9/1178 417/403 |
| 6,120,732 A | 9/2000 | Toledo et al. | |
| 6,644,930 B1 * | 11/2003 | Kuismanen | F04B 15/02 417/393 |
| 6,652,741 B1 | 11/2003 | Marinzet | |
| 6,827,479 B1 * | 12/2004 | Xia | B01F 3/0807 366/162.4 |
| 8,951,023 B2 * | 2/2015 | O'Connor | F04B 15/02 417/216 |
| 9,192,190 B2 | 11/2015 | Guamis Lopez et al. | |
| 9,458,843 B2 * | 10/2016 | Cardelius | F04B 9/1172 |
| 10,121,685 B2 * | 11/2018 | Shite | H01L 21/6715 |
| 2011/0318195 A1 * | 12/2011 | Cardelius | F04B 9/1172 417/53 |
| 2013/0167697 A1 | 7/2013 | Reukers | |
| 2013/0243644 A1 | 9/2013 | Guamis Lopez et al. | |
| 2013/0280102 A1 | 10/2013 | Simmons et al. | |
| 2014/0072453 A1 | 3/2014 | Vandergon et al. | |

OTHER PUBLICATIONS

Poliseli-Scopel, F. H., Hernandez-Herrero, M., Guamis, B., and Ferragut, V., "Comparison of ultra high pressure homogenization and conventional thermal treatments on the microbiological, physical and chemical quality of soymilk", LWT—Food Science and Technology, 46, pp. 42-48 (2012); DOI: 10.1016/j.lwt.2011.11.004.

Pereda, J., Ferragut, V., Quevedo, J. M., Guamis, B., and Trujillo, A. J., "Heat damage evaluation in ultra-high pressure homogenized milk", Food Hydrocolloids, 23, pp. 1974-1979 (2009); DOI: 10.1016/j.foodhyd.2009.02.010.

Asano, Y., Ihara, K., Mori, T., Mizota, T., Iwatsuki, K., and Sotoyama, K., "Flash Sterilization System using a High-pressure Homogenizer", Nippon Shokuhin Kagaku Kogaku Kaishi, vol. 47, No. 2, pp. 130-135 (2000).

Cruz, N., Capellas, M., Hernandez, M., Trujillo, A.J., Guamis, B., and Ferragut, V., "Ultra high pressure homogenization of soymilk: Microbiological, physicochemical and microstructural characteristics", Food Research International 40, pp. 725-732 (2007); DOI: 10.1016/j.foodres.2007.01.003.

Serra, M., Trujillo, A. J., Jaramillo, P. D., Guamis, B., and Ferragut, V., "Ultra-High Pressure Homogenization-Induced Changes in Skim Milk: Impact on Acid Coagulation Properties", Journal of Diary Research, pp. 69-75 (2008); DOI: 10.1017/S0022029907003032.

Zamora i Viladomiu, Anna, "Ultra-high pressure homogenisation of milk: effects on cheese-making" Doctoral Thesis, Universitat Autònoma de Barcelona (2009).

* cited by examiner

SYSTEM FOR HIGH PRESSURE, HIGH SHEAR PROCESSING OF FLUIDS

CROSS REFERENCE TO RELATED APPLICATIONS

This application is a U.S. national phase application under 35 U.S.C. § 371 of International Patent Application Serial No. PCT/US2016/024452, titled "SYSTEM FOR HIGH PRESSURE, HIGH SHEAR PROCESSING OF FLUIDS" and filed on Mar. 28, 2016, which claims priority to U.S. Provisional Patent Application 62/139,706 filed on Mar. 28, 2015, the entire contents of which are incorporated herein by reference.

FIELD OF THE INVENTION OF THE DISCLOSURE

The present disclosure is directed to the high shear processing of multiphase fluids for the purpose of mixing, size reduction, emulsification, instant heating, or the like through the use of ultrahigh pressurized fluidic discharge. This process typically can be described as homogenization but can also be used for the purpose of size reduction of a particular phase.

Particularly, the present disclosure relates to the use of ultrahigh pressure fluidic shear where the operating pressure is greater than 20,000 psi and where the fluid will benefit from extreme fluid shear and heating achieved during ultrahigh pressure discharge. More particularly, the disclosure relates to a method and system for the high shear processing of products utilizing a modular approach where the initial generation of the processing pressure is accomplished by a fluid independent of the product being processed. Specifically, the disclosure relates to a novel technique for allowing a high pressure source fluid to transfer pressure to a product in isolators and discharged through valves at pressure in excess of 20,000 psi while allowing easy cleaning of the equipment, long component life and suitability for thick or viscous products.

BACKGROUND OF THE DISCLOSURE

Pressure discharge based high shear processing is a common processing method for foods and other substances where size reduction, emulsification, and mixing are required. Homogenized milk for example is typically processed at 3,000 psi. This is typically accomplished by use of a positive displacement pump and a discharge nozzle, sometimes called homogenizing valve. A pump is used to force the product through a nozzle under pressure. At the nozzle, the fluid experiences high shear stress as the pressure energy is converted to velocity. Homogenization happens at this point due to high fluid shear stresses, cavitation, and subsequent fluid impingement. Higher pressures typically produce a greater homogenization effect.

Ongoing research suggests that homogenization at ultrahigh pressure (for example from 20,000 psi to 60,000 psi) may result in significant advantages. These advantages are related to the generation of extreme fluid shear stresses, which can rupture cellular materials, and achieve instantaneous heating of significant magnitude. For example, the discharge of 20° C. water from 60,000 psi will instantly increase the temperature of that water to 120° C. due to the conversion of potential pressure energy to kinetic energy, and then to thermal energy. The supersonic fluid flow at the homogenizer valve generates extremely high shear stress. These effects may lead to desirable thermal effects as well as greater size reduction effects. The thermal effects may be used to achieve rapid thermal processing. The shear effects may be used to achieve the creation of nanoparticle suspensions.

The current approaches employed to build direct displacement pump type homogenizers are difficult at ultrahigh pressures due to the high stresses on the mechanical pump components. Every cylinder in the pump would alternate between no pressure and extreme pressure during every cycle. Thus, for a pump operating at 500 rpm, every hour of operation would result in 30,000 pressure cycles. Doing this at 60,000 psi is a high technical challenge.

Large reciprocating pistons working at ultrahigh pressure require tremendous forces on the pistons and connected components. For example, at 60,000 psi, a 2" diameter homogenizer piston will require a force of 188,000 lbs. to move. The best approach to engineer a high pressure pump is to reduce the forces by reducing the diameter of the piston. In order to compensate for the reduced volumetric flow of a smaller piston, a higher pump rotational speed would be used. However, high rotational speed and smaller diameter would be incompatible with viscous products. Furthermore, smaller size pump components would make equipment cleaning more difficult due smaller passageways.

High pressure pumps, however, have been developed for other industrial uses, such as water jet cutting and cleaning. These pumps work with clean water so valves are not subjected to viscous fluids. Processing products such as food through these pumps will not be possible. Cleaning these pumps from complex organic materials will also be difficult due to small internal passages.

There is a need to perform ultrahigh pressure fluid shear processing without the need to build massive conventional homogenizer pumps.

SUMMARY OF THE DISCLOSURE

One aspect of the disclosure is directed to a high fluid shear processing system. In one embodiment, the system includes an ultrahigh pressure pump capable of advancing a first fluid at a pressure of at least 20,000 psi, and at least one isolator for selectively containing and discharging (or dispensing) a second fluid. Each isolator includes an isolator wall defining a chamber and a separator positioned in the chamber and movable between a first end of the chamber and a second end of the chamber. The separator engages the isolator wall to further divide the chamber into a first sub-chamber and a second sub-chamber that are in pressure communication with each other but are not in fluid communication with each other. A first sub-chamber inlet valve is in fluid communication with the ultrahigh pressure pump and the first sub-chamber. A first sub-chamber outlet valve is in fluid communication with the first sub-chamber. A first check valve is in fluid communication with the second sub-chamber to allow fluid to enter the second sub-chamber. A second check valve is in fluid communication with the second sub-chamber to exhaust fluid from the second sub-chamber. A processing unit is in fluid communication with the second check valve.

In some embodiments the processing unit is a homogenizing valve.

In some embodiments, there are at least two isolators, and the isolators are configured so that while a first one of the isolators is filling, a second one of the isolators is discharging.

In some embodiments, a first proximity sensor detects the proximity of the separator to the first end of the chamber, and a second proximity sensor detects the proximity of the separator to the second end of the chamber.

In some embodiments, there is more than one high pressure pump to produce a continuous flow state of the first fluid to the isolators.

In some embodiments, there is a low pressure transfer pump in fluid communication with the first check valve, and configured to advance a second fluid to the first check valve.

In some embodiments, a manifold pressure sensor is in fluid communication with a manifold that is in fluid communication with the second check valve.

In some embodiments, a pump pressure sensor is in fluid communication with the ultrahigh pressure pump.

In some embodiments, a temperature controlled zone is downstream of the processing unit.

In some embodiments, a controllable pressure discharge valve is in fluid communication with the second outlet of each isolator, and is downstream of the processing unit.

In some embodiments, a vent is in fluid communication with the second sub-chamber of the at least one isolator, and is configured to allow clean in place operation of the system.

In some embodiments, the system includes a processor, at least one discharge pressure sensor in communication with the processor for measuring the discharge pressure, and a controller in communication with the processor. The controller is configured to throttle the pressure discharge valve to reduce flow during the switchover process between isolators, thereby maintaining a more constant discharge pressure (or a constant discharge pressure).

In some embodiments, the pumps are crank shaft driven positive displacement water pumps capable of at least 20,000 psi.

In some embodiments, the pumps are hydraulic intensifier pumps capable of constant pressure operation of at least 20,000 psi.

In some embodiments, the isolators, manifold, and pressure discharge valve can be maintained at a preselected temperature by insulation and/or secondary heating.

In some embodiments, the final product can be filled into containers at a collection zone in an aseptic manner.

In some embodiments, the first fluid is clean water.

In some embodiments, each isolator is positioned in a clean room environment.

In some embodiments, the isolator and the pump are separate modules that can be reconfigured.

In another aspect of the present disclosure, a high pressure isolator is provided. The isolator has an isolator wall defining a chamber. The isolator has a separator positioned in the chamber and movable between a first end of the chamber and a second end of the chamber. The separator engages the isolator wall to further divide the chamber into a first sub-chamber and a second sub-chamber that are in pressure communication with each other but are not in fluid communication with each other.

In some embodiments, the first sub-chamber has a first inlet port and a first outlet port, and the first inlet port and the first outlet port are positioned vertically one above the other, and at an outer edge of the chamber. The second sub-chamber has a second inlet port and a second outlet port. The second inlet port and the second outlet port are positioned vertically one above the other, and at an outer edge of the chamber.

In some embodiments, the isolator is contained in an insulating jacket and/or provided with heating and/or provided with cooling to provide temperature control.

In some embodiments, the isolator contains a structure for agitating the product so as to keep multiphase mixtures in suspension prior to exiting the isolator.

In another aspect of the present disclosure, a method is provided for high pressure, high shear processing of a fluid. A user provides at least one isolator for selectively containing and dispensing a second fluid. Each isolator has an isolator wall defining a chamber and a separator positioned in the chamber and movable between a first end of the chamber and a second end of the chamber. The separator engages the isolator wall to further divide the chamber into a first sub-chamber and a second sub-chamber that are in pressure communication with each other but are not in fluid communication with each other. A user provides a first check valve in fluid communication with the second sub-chamber. The first check valve is configured to allow the second fluid to enter the second sub-chamber. A user provides a second check valve in fluid communication with the second sub-chamber. The second check valve is configured to exhaust fluid from the second sub-chamber. A user provides a processing unit in fluid communication with the second check-valve. Then a first fluid is alternately directed at a pressure of at least 20,000 psi into the first sub-chamber and a second fluid is directed into the second sub-chamber. The directing of the first fluid into the first sub-chamber causes the second fluid to be discharged from the second sub-chamber, through the second check valve, and through the processing valve.

In some embodiments, the processing unit is a homogenizing valve.

In some embodiments, the temperature of the second fluid is controlled when it is in the manifold.

In some embodiments, there are at least two isolators.

In some embodiments, two isolators discharge the second fluid out of phase to provide a continuous flow of the second fluid through the manifold.

In some embodiments, the position of the separator is detected with respect to the first end of the chamber and the second end of the chamber for each respective isolator, and the isolators are controlled to be out of phase.

In some embodiments, the second fluid is collected after it has passed through the processing unit.

In some embodiments, a discharge valve is provided downstream of the processing unit, and the discharge valve is controlled.

In some embodiments, the second fluid is cooled after it has passed through a pressure discharge valve.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
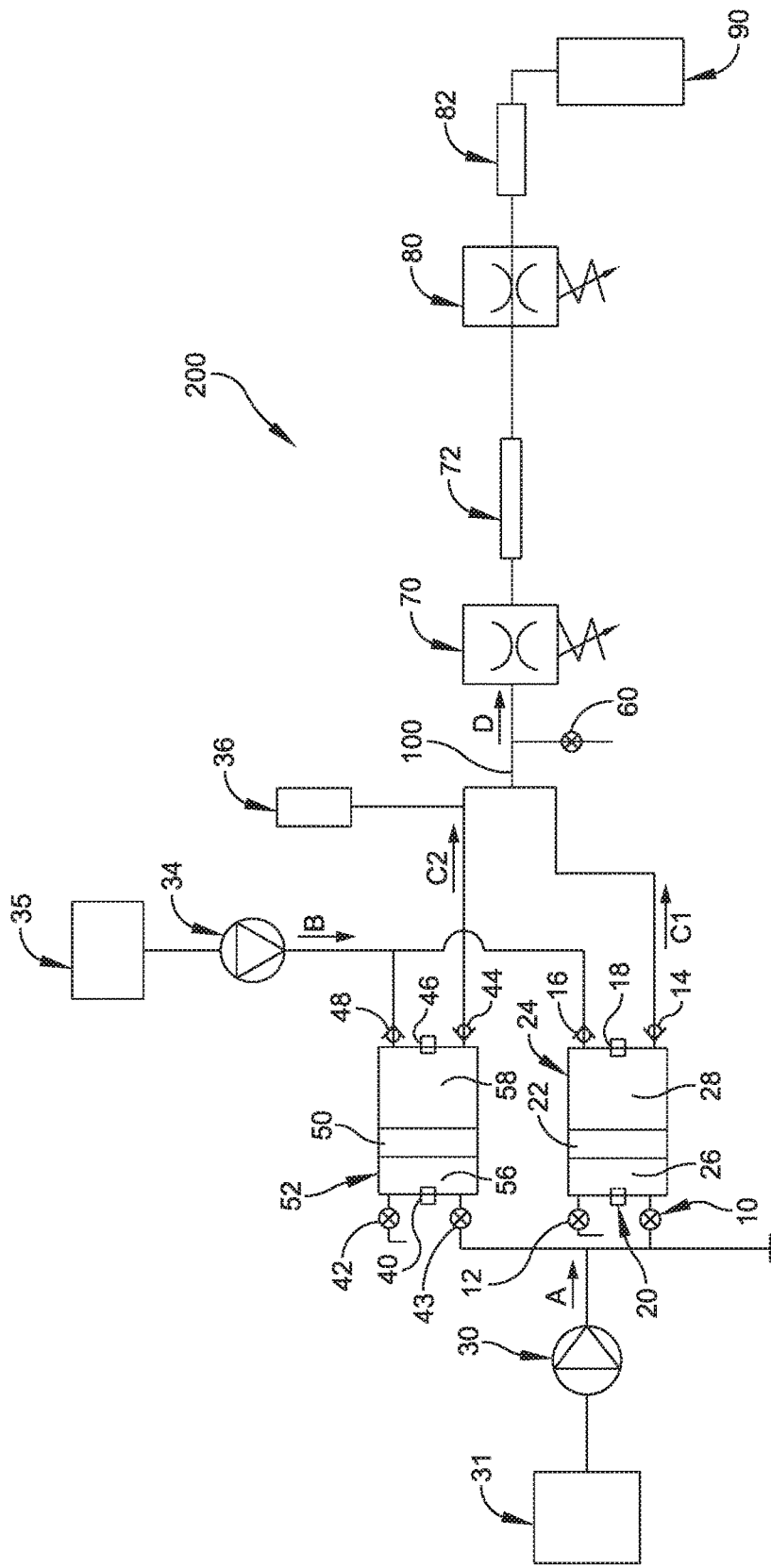
FIG. 1 is a schematic view of a system for high pressure, high shear processing of fluids of an embodiment of the present disclosure.

The present disclosure relates generally to high shear processing of multiphase fluids for the purpose of mixing, size reduction, emulsification, instant heating, or the like through the use of ultrahigh pressurized fluidic discharge. Specifically, embodiments of the present disclosure are described below with reference to an isolator that allows a first fluid under high pressure to cause a second fluid to be processed in a homogenizing (or other processing) system without having the first fluid directly contact the second fluid.

The method and system of the present disclosure are also useful for processing food and biological products based on emulsions, suspensions, and where cellular destruction and particle size reduction is desired.

One or more pressure-source-independent isolators is used to transfer pressure from a high pressure fluid, such as pressurized clean water obtained from high performance industrial pump(s), to the product to be homogenized (or otherwise processed). An isolator is a constant internal diameter cylinder separated by a movable piston (separator). A typical isolator diameter would be between 3" and 6" but larger or smaller diameter may be possible. Pressure on one side of the isolator is transferred to the other side of the isolator by the movement of the floating piston. Since the pressures on both sides of the isolator piston are almost the same, there is little friction during piston movement and the seal on the isolator piston is not subject to high wear.

This system combines the use of commercial ultrahigh pressures pumps, isolators, and valves to enable the homogenization of products at ultrahigh operating pressure (20,000 psi to 60,000 psi).

The isolator prevents the mixing of the source water and the product, but allows pressure to be transferred to the product. In other embodiments, the isolator can be designed as compressible bellows or bladder without a moving piston. In all cases, one side of the isolator is in fluid communication with the pump which provides a source of high pressure water while the other side of the isolator is in fluid communication with the product and an external homogenization valve. The two sides of the isolator are in pressure communication with each other. The valve is adjustable to control the flow rate from the isolator such that a defined differential pressure is maintained during discharge. The valve will self-regulate by opening or closing to maintain a constant pressure at different flow rates.

The system works as follows: Product is transferred into an isolator by way of a low pressure transfer pump, for example, a diaphragm pump. The product flows into the isolator through a check valve. Once the isolator is filled, pressurized water (or another fluid) from a high pressure pump is admitted through a valve to the other side of the isolator. Pressure is transferred to the product by the movement of the isolator piston within the isolator. The pressurized product exits the first isolator via a second check valve and is discharged though a controlled discharge valve. Product is then collected. When the first isolator is nearly empty, a proximity sensor stops the flow of high pressure water into the first isolator and admits water flow into a second isolator. Product from the second isolator then flows to the controlled discharge valve. Concurrent with the discharge of one isolator, the other isolators is being refilled. Refilling is performed by the opening of a discharge valve on the water side of the isolator, allowing the water side to drain and new product to enter the product side.

Referring now to the drawings, and more particularly to FIGS. 1-5, there is generally indicated at 200 a system for high pressure, high shear processing of fluids according to an embodiment of the disclosure. As shown, the system 200 includes two isolators 24, 52. Isolator 24 has an isolator wall 81 that defines a chamber 89. Chamber 89 is subdivided by a separator (isolator piston) 22 into two sub-chambers 26, 28. Due to movement of the separator 22 within the chamber 89, the respective volumes of the sub-chambers 26, 28 are variable and are inversely proportional to one another. Isolator 52 has an isolator wall 91 that defines a chamber 99. Chamber 99 is subdivided by a separator (isolator piston) 50 into two sub-chambers 56, 58. Due to movement of the separator 50 within the chamber 99, the respective volumes of the sub-chambers 56, 58 are variable and are inversely proportional to one another.

The isolators 24, 52 are configured to operate out of phase, so that when one isolator (e.g., isolator 24) is filling with a second fluid, the other isolator (e.g., isolator 52) is discharging (or dispensing) the second fluid. The operation of the isolators is described in more detail below.

The components of the system 200 include, in part, one or more positive displacement pump(s) 30 in fluid communication with two (or more) isolators 24, 52. As shown in FIG. 1, the positive displacement pump 30 is capable of advancing a first fluid at a pressure of at least 20,000 psi. In some embodiments, the positive displacement pump 30 is capable of advancing the first fluid at a pressure of 60,000 psi. In still other embodiments, the positive displacement pump 30 is capable of pumping the first fluid at a pressure in the range of 20,000 psi to 60,000 psi, including the endpoints of the range. The pump 30 can be located in a separate room to keep the production area clean and noise free. As discussed, additional positive displacement pumps 30 can be provided depending on the configuration of the system 200.

The fluid pressure generated by the pump 30 is monitored by a pressure sensor 32. A high pressure shut off valve 10 is located between the pump 30 and the water side of the isolator 24. A vent valve 12 is located on the same side of the isolator 24. A high pressure shut off valve 43 is located between the pump 30 and the water side of the isolator 52. A vent valve 42 is located on the same side of the isolator 52.

In operation, the pump 30 is selectively in fluid communication with one of the two isolators 24, 52 by selective opening and closing the respective shut off valves 10, 43. The pump 30 provides pressurized water at 60,000 psi alternately to each of the isolators 24, 52. When the pressurized water is provided to the isolator 24, movement of the isolator piston 22 pressurizes the product contained in the sub-chamber 28 to the same pressure as the pressure in the sub-chamber 26. When the pressurized water is provided to the isolator 52, movement of the isolator piston 50 pressurizes the product contained in sub-chamber 58 to the same pressure as in the sub-chamber 56. At all times, the water (or other first fluid) and the product (or the other second fluid) are in pressure communication, but not fluid communication with each other. Pressure communication means that the isolator piston freely moves within the isolator in response to a change in relative pressures of the sub-chambers of the isolator.

Product flows out of the isolator 24 via a check valve 14 into a common manifold 100. Product flows out of the isolator 52 via a check valve 44 into the common manifold 100. The pressure in the manifold 100 is measured by a pressure sensor 36 and is used to control a homogenizing valve 70. The discharged product flows from the manifold 100 to a discharge valve 80 and then to the downstream section.

When sub-chamber 28 of isolator 24 is nearly empty, as sensed by a proximity sensor 18, the pump 30 is switched to fill sub-chamber 56 of the second isolator 52 by closing high pressure shut off valve 10 and opening high pressure shut off valve 43. At that time, the sub-chamber 28 of the first isolator 24 refills with product. When sub-chamber 58 of isolator 52 is nearly empty, as sensed by a proximity sensor 46, the pump 30 is switched to fill sub-chamber 26 of the first isolator 24 by closing high pressure shut off valve 43 and opening high pressure shut off valve 10. At that time, the sub-chamber 58 of the second isolator 52 refills with product.

Refilling is provided by the use of a low pressure transfer pump 34. The transfer pump 34 is in fluid communication with an inlet check valve 16 that only allows product to flow into the isolator 24. By opening vent valve 12, the water side (sub-chamber 26) can be drained and product can enter sub-chamber 28 of the isolator 24. Similarly, the transfer pump 34 is in fluid communication with an inlet check valve 48 that only allows product to flow into the isolator 52. By opening vent valve 42, the water side (sub-chamber 56) can be drained and product can enter sub-chamber 58 of the isolator.

The discharged product would flow in the downstream section to a temperature controlled zone 72. Typical temperatures within this zone would be sufficient to achieve a targeted thermal exposure. For example temperature near 121 C would be used for the thermal destruction of bacterial spores within foods. This can be used to hold a high temperature or experience cooling at a cooling zone 82 to a low temperature prior to collection at a collection zone 90. An optional discharge valve 80 can be used if a two-step decompression process is desired.

As described above, the exemplary embodiment of the system 200 of the present disclosure includes the high pressure pump 30 that serves as a source of a first fluid, and the low pressure pump 34 that serves as a source of a second fluid. In some embodiments, the high pressure pump 30 can be in fluid communication with a reservoir 31 that serves as a source of a first fluid. In other embodiments, the high pressure pump 30 can include a reservoir that serves as a source of the first fluid. The high pressure pump 30 advances the first fluid along fluid conduits in the direction of arrow A in FIG. 1 towards the isolators 24, 52.

In some embodiments, the low pressure pump 34 can be in fluid communication with a reservoir 35 that serves as a source of a second fluid. In other embodiments, the low pressure pump 34 can include a reservoir that serves as a source of the second fluid. The low pressure pump advances the second fluid along a conduit in the direction of arrow B in FIG. 1 towards the isolators 24, 52.

Figure 2:
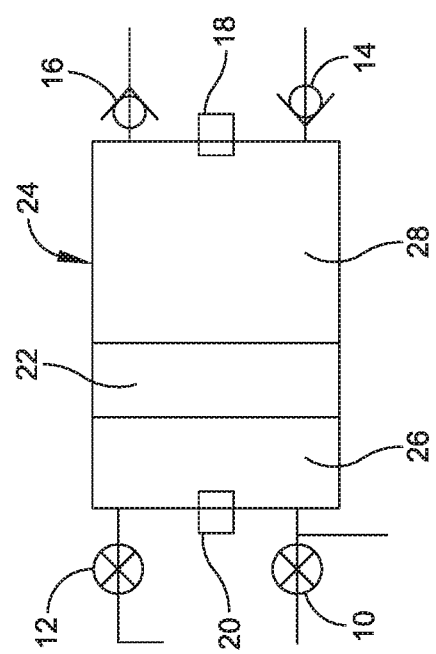
FIG. 2 is a schematic view of inlet valves and outlet valves of an isolator of an embodiment of the present disclosure.
Figure 3:
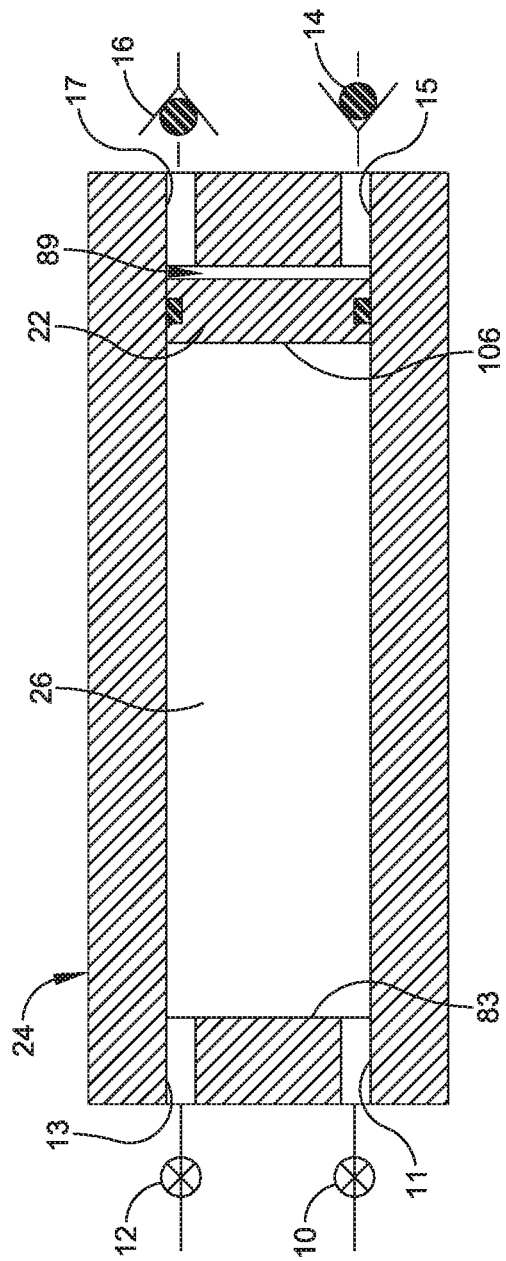
FIG. 3 is a schematic view of the isolator with oulet ports located near an inner surface of an isolator wall of the isolator of an embodiment of the present disclosure.
Figure 4:
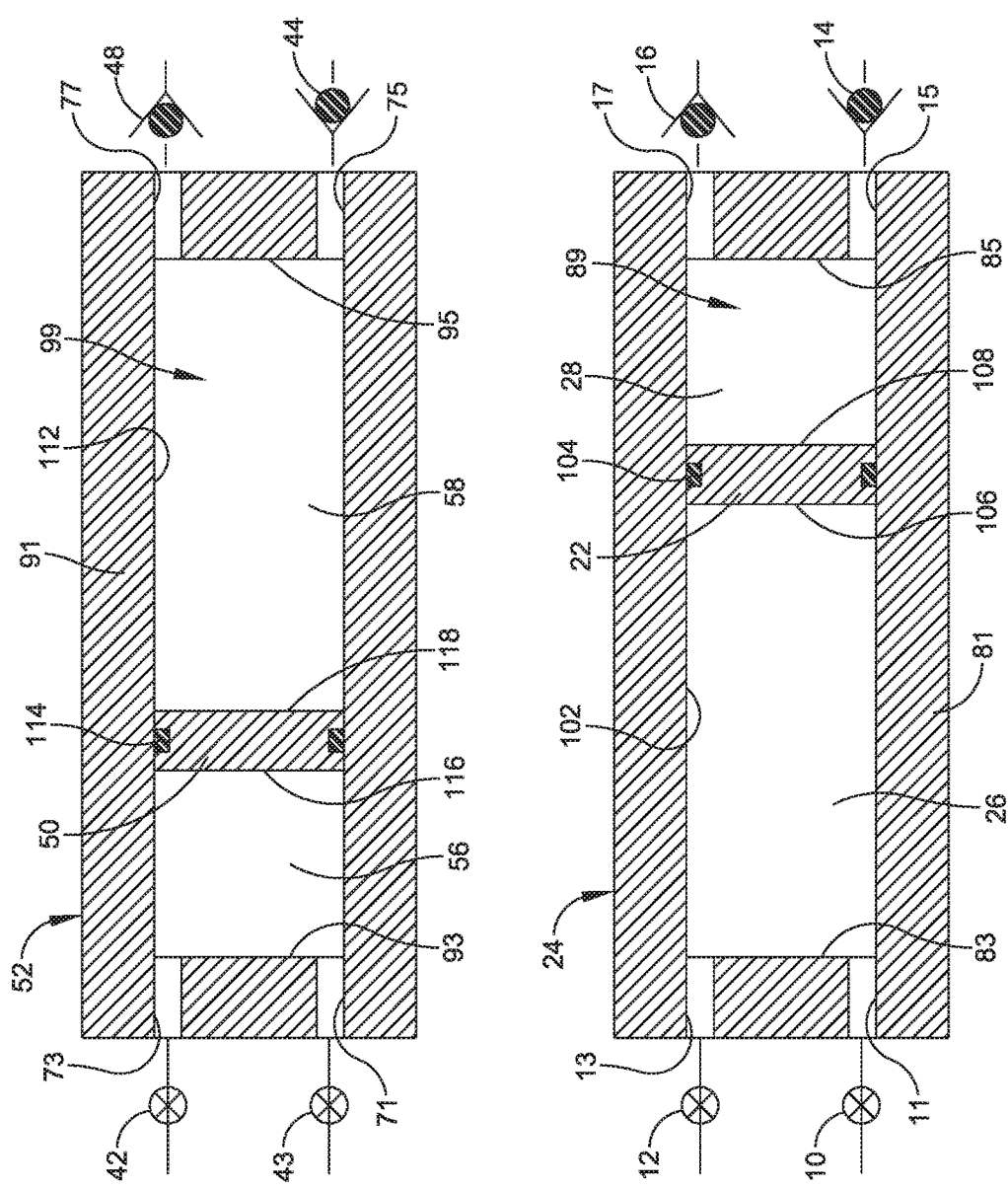
FIG. 4 is a partial schematic view of the system of FIG. 1 as product is being advanced into a first isolator and expelled from a second isolator.
Figure 5:
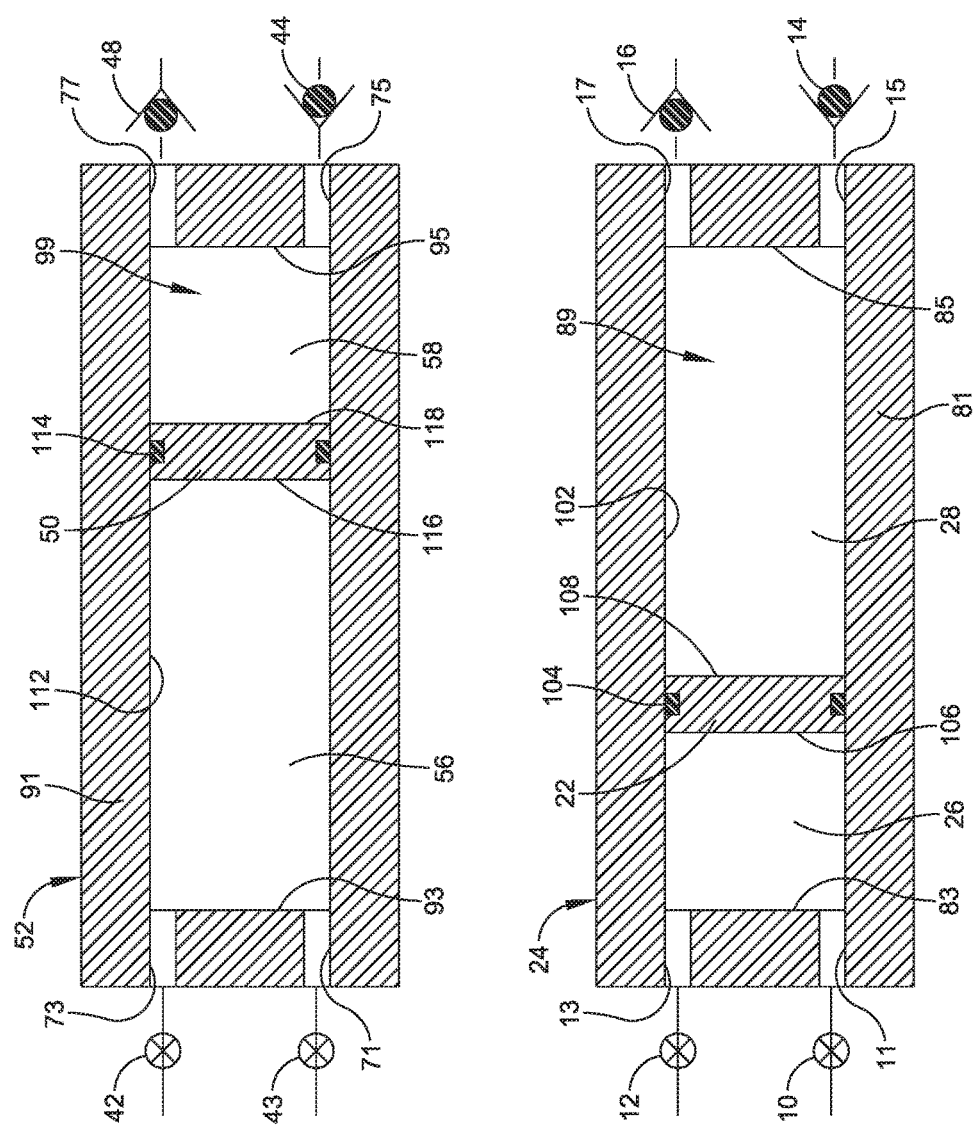
FIG. 5 is a partial schematic view of the system of FIG. 1 as product is being expelled from the first isolator and advanced into the second isolator.

FIGS. 2 and 3 show isolator 24 apart from isolator 52. FIGS. 4 and 5 show both of the isolators 24, 52. The exemplary embodiment includes two isolators 24, 52 for selectively containing and dispensing a second fluid.

As mentioned above, isolator 24 has the isolator wall 81 defining the chamber 89. This chamber 89 is further subdivided by a separator (isolator piston) 22 that is positioned in the chamber 89 and is movable between a first end 83 of the chamber 89 and a second end 85 of the chamber 89. The separator 22 engages the isolator wall 81 to divide the chamber 89 into a first sub-chamber 26 and a second sub-chamber 28, and to form a seal between the first sub-chamber 26 and the second sub-chamber 28.

The first sub-chamber 26 is defined by the first end 83 of the chamber, the inner surface 102 of the isolator 24, and a first surface 106 of the isolator piston 22. The second sub-chamber 28 is defined by the second end 85 of the chamber, the inner surface 102 of the isolator 24 and a second surface 108 of the isolator piston 22.

To sealingly engage the inner surface 102 of the isolator 24, the separator 22 has an O-ring 104 seated on its outer periphery. Because of the seal provided by the isolator piston 22, the first sub-chamber 26 and the second sub-chamber 28 are in pressure communication with each other but are not in fluid communication with each other. Thus, a working fluid, such as clean water, can be directed into the first sub-chamber (or water side of the isolator) 26, while a flowable product to be can be directed into the second sub-chamber (or flowable product side of the isolator) 28.

The first sub-chamber 26 has a first inlet port 11 and a first outlet port 13. The second sub-chamber 28 has a second inlet port 17 and a second outlet port 15.

Similarly, the isolator 52 has the isolator wall 91 defining the chamber 99. This chamber 99 is further subdivided by a separator (isolator piston) 50 that is positioned in the chamber 99 and is movable between a first end 93 of the chamber and a second end 95 of the chamber 99. The separator 50 engages the isolator wall 91 to divide the chamber 99 into a first sub-chamber 56 and a second sub-chamber 58, and to form a seal between the first sub-chamber 56 and the second sub-chamber 58.

The first sub-chamber 56 is defined by the first end 93 of the chamber, the inner surface 112 of the isolator 52, and a first surface 116 of the isolator piston 50. The second sub-chamber 58 is defined by the second end 95 of the chamber, the inner surface 112 of the isolator 52, and a second surface 118 of the isolator piston 50.

To sealingly engage the inner surface 112 of the isolator 52, the separator 50 has an O-ring 114 seated on its outer periphery. Because of the seal provided by the isolator piston 50, the first sub-chamber 56 and the second sub-chamber 58 are in pressure communication with each other but are not in fluid communication with each other, respectively. Thus, a working fluid, such as clean water, can be directed into the first sub-chamber (or water side of the isolator) 56, while a flowable product to be can be directed into the second sub-chamber (or flowable product side of the isolator) 58.

The first sub-chamber 56 has a first inlet port 71 and a first outlet port 73. The second sub-chamber 58 has a second inlet port 77 and a second outlet port 75.

As shown in FIGS. 4 and 5, the isolators 24, 52 are out of phase during operation of the system of the present disclosure. In particular, the two isolators 24, 52 are preferably 180° out of phase, so that a distance between the first surface 106 of the first isolator piston 22 and the first end 83 of the isolator 24 is equal to (or at least approximately equal to) a distance between the second surface 118 of the second isolator piston 50 and the second end 95 of the second piston 54.

Other embodiments may include more than two isolators. Where there are more than two isolators, the discharge of the second fluid from the respective isolators can be appropriately timed. For example, where there are three isolators, the isolators are 120° out of phase, and where there are four isolators, the isolators are 90° out of phase.

In the isolator 24, a first sub-chamber inlet valve 10 selectively provides fluid communication between the pump 30 to the first inlet port 11, and a first sub-chamber outlet valve (vent valve) 12 selectively provides fluid communication to the first outlet port 13. In the isolator 52, a first sub-chamber inlet valve 43 selectively provides fluid communication between the pump 30 to the first inlet port 71, and a first sub-chamber outlet valve (vent valve) 42 selectively provides fluid communication to the first outlet port 73.

The flow of the first fluid from the high pressure pump 30 to the isolator 24 is controlled by the inlet valve 10 of the isolator 24. The flow of the first fluid from the high pressure pump 30 to the isolator 52 is controlled by the inlet valve 43 of the isolator 52. When the inlet valve 10 of the isolator 24 is open, the inlet valve 43 of the isolator 52 is closed. Conversely, when the inlet valve 43 of the isolator 52 is open, the inlet valve 10 of the isolator 24 is closed.

The flow of the second fluid to the isolator 24 is controlled by the check valves in fluid communication with the isolator 24. A first check valve 16 is in fluid communication with the second inlet port 17, with the first check valve 16 being configured to allow the second fluid to enter, but not exit, the second sub-chamber 28 through the second inlet port 17. A second check valve 14 is in fluid communication with the second outlet port 15, and is configured to allow the second fluid to exit, but not enter the second sub-chamber 28 through the second outlet port 15.

The low pressure transfer pump 34 is in fluid communication with the first check valve 16, and is configured to advance a second fluid to the first check valve 16.

Similarly, the flow of the second fluid is controlled by the check valves in fluid communication with the isolator 52. A first check valve 48 is in fluid communication with the second inlet port 77, with the first check valve 48 being configured to allow the second fluid to enter, but not exit, the second sub-chamber 58 through the second inlet port 77. A second check valve 44 is in fluid communication with the second outlet port 75, and is configured to allow the second fluid to exit, but not enter the second sub-chamber 58 through the second outlet port 75.

The low pressure transfer pump 34 is in fluid communication with the first check valve 48, and is configured to advance a second fluid to the first check valve 48.

The pressure in the low pressure pump 34 (typically 10 to 50 psi) is lower than the pressure in the high pressure pump 30.

FIG. 4 shows isolator 24 in a discharge stroke, and isolator 52 in an intake stroke, with respect to the second fluid. In the intake stroke, the first fluid is vented out of the first sub-chamber 56 through the first outlet port 73 and the second fluid is pumped by the low pressure pump 34 into the second sub-chamber 58 through the second inlet port 77. During the discharge stroke, the second fluid is pushed out of the second sub-chamber 28 as the isolator piston moves in response to the pressure of the first fluid provided by the high pressure pump 30.

The second fluid flows out of the second outlet port 15 of the isolator 24 and is directed through conduits along arrow C1 into the manifold 100 that is in fluid communication with the second outlet port by the second check valve 14. The second check valve allows the second fluid to flow from the second sub-chamber 28 to the manifold 100.

The second fluid flows out of the second outlet port 75 of the isolator 52 and is directed through conduits along arrow C2 into the manifold 100 that is in fluid communication with the second outlet port by the second check valve 44. The second check valve allows the second fluid to flow from the second sub-chamber 54 to the manifold 100.

The combined second fluids flow through the manifold 100 along arrow D in FIG. 1.

In the exemplary embodiment, a homogenizing valve or other processing unit 70 is positioned downstream of the isolators 24, 52, and is in fluid communication with the manifold 100. The homogenizing valve 70 can be selected from homogenizing valves known in the art, and is useful for generating high fluid shear on the fluid as the fluid passes through the homogenizing valve. In other embodiments, another processing unit can be used in place of the homogenizing valve.

In the exemplary embodiment, there are two isolators 24, 52. The two isolators 24, 52 are configured so that while a first one of the isolators (e.g., isolator 24) is filling, a second isolator (e.g., isolator 52) is discharging.

Figure 6:
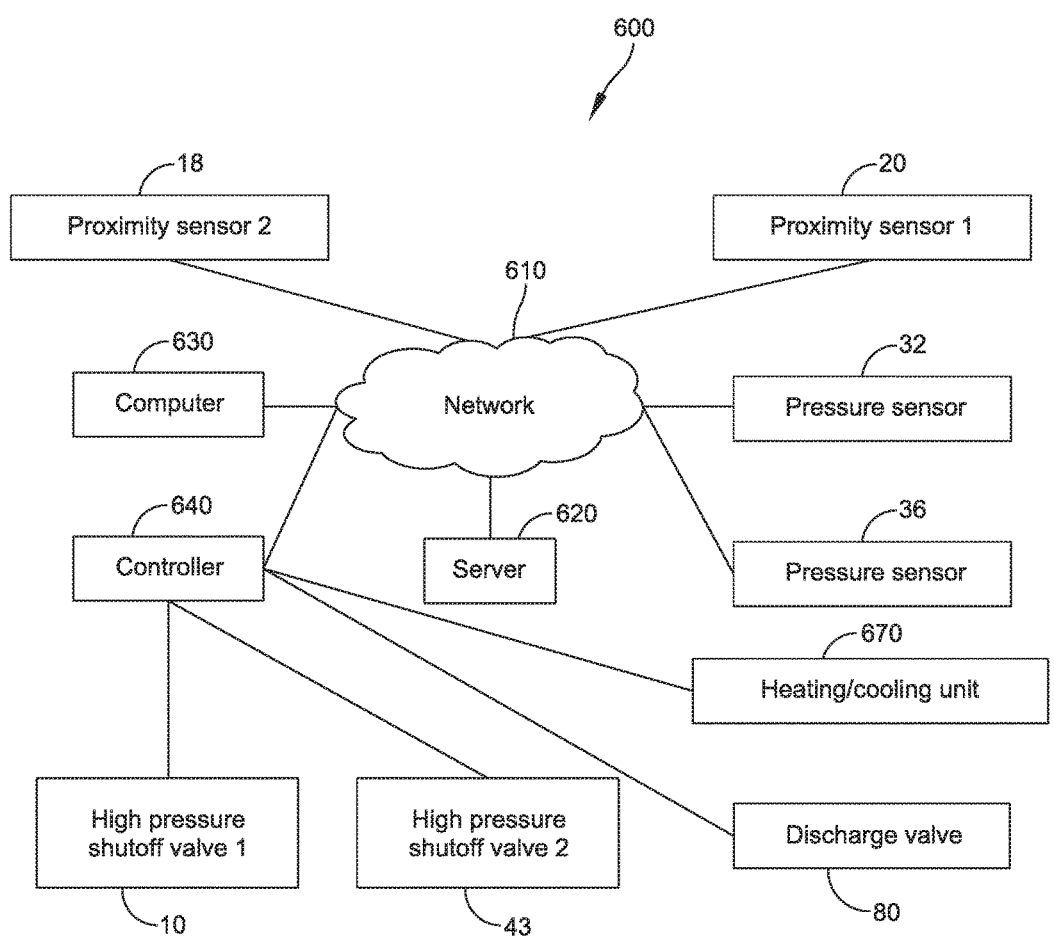
FIG. 6 is a block diagram of components of the exemplary embodiment of a system for high pressure, high shear processing of fluids.

Referring additionally to FIG. 6, the operation of the high pressure shutoff valve 10 can be controlled by a controller 640 in response to position information about the isolator piston 22. FIG. 2 shows how proximity sensors 18, 20 can be provided in the ends of an isolator 24. Sensors can be provided in one isolator or more than one isolator. When the isolator piston 22 of isolator 24 is adjacent the first end 83 of the chamber, the proximity sensor 20 sends a signal to the controller 640 that causes the controller to open the high pressure shutoff valve 10 to allow the high pressure pump 30 to move the first fluid into the first sub-chamber 26 through the first inlet port 11. When the proximity sensor 18 senses that the isolator piston 22 is adjacent to the second end 85 of the second sub-chamber 28, the proximity sensor 18 sends a signal to the controller 640 that causes the controller to close the high pressure shutoff valve 10 to prevent the first fluid from being advanced into the first sub-chamber 26 through the first inlet 11.

Similarly, the operation of the high pressure shutoff valve 43 can be controlled by a controller 640 in response to position information about the isolator piston 50. FIG. 2 shows how proximity sensors 46, 40 can be provided in the ends of an isolator 52. Sensors can be provided in one isolator or more than one isolator. When the isolator piston 50 of isolator 52 is adjacent the first end 93 of the chamber, the proximity sensor 40 sends a signal to the controller 640 that causes the controller to open the high pressure shutoff valve 43 to allow the high pressure pump 30 to move the first fluid into the first sub-chamber 56 through the first inlet port 71. When the proximity sensor 46 senses that the isolator piston 50 is adjacent to the second end 95 of the second sub-chamber 58, the proximity sensor 46 sends a signal to the controller 640 that causes the controller to close the high pressure shutoff valve 43 to prevent the first fluid from being advanced into the first sub-chamber 56 through the first inlet 71.

In some embodiments, the high pressure pump 30 can be a plurality of pumps used to produce a continuous flow state.

To measure the pressure of the second fluid flowing through the manifold 100, some embodiments include a manifold pressure sensor 36 in fluid communication with the manifold.

In some embodiments, the system further includes a pump pressure sensor 32 in fluid communication with the ultrahigh pressure pump to monitor the pressure of the high pressure pump 30.

In some embodiments, the system 200 further includes a temperature controlled zone 72 downstream of the homogenizing valve or other processing unit 70.

In some embodiments, the system 200 further includes a controllable pressure discharge valve 80 in fluid communication with the second outlet of each isolator via the manifold 100. The controllable pressure discharge valve 80 is downstream of the homogenizing valve 72 or other processing unit.

The system is capable of being cleaned in place. In some embodiments, there is a vent valve (cleaning port) 60 that is in fluid communication with the second outlet port 15 of the first isolator 24 via the outlet check valve 14, with the second outlet port 75 of the second isolator 52, and with the manifold 100. This vent valve 60 allows the manifold 100 to be flushed through a clean in place operation of the system.

In some embodiments, the sensor 36 configured to measure discharge pressure is in fluid communication with the manifold 100. The sensor 36 is in communication with a processor on a server 620. The controller 640 is in communication with the processor, and is configured to throttle the discharge valve 80 to reduce flow during the switchover process between isolators 24, 52, thereby maintaining a more constant discharge pressure.

In some embodiments, each of the high pressure pump(s) 30 is a crank shaft driven positive displacement water pumps capable of at least 20,000 psi.

In some embodiments, each of the high pressure pump(s) is a hydraulic intensifier pumps capable of constant pressure operation of at least 20,000 psi.

In some embodiments, the isolator 24, the isolator 52, the manifold 100, and the discharge valve 80 can be maintained at a preselected temperature by insulation and/or secondary heating.

In some embodiments, the second fluid can be processed by the system 200 into a final product that can be filled into containers at a collection zone 90 in an aseptic manner.

In some embodiments, each isolator 24, 52 is positioned in a clean room environment. The high pressure pump 30 and the low pressure transfer pump 34 do not need to be positioned in the clean room environment in this case. For example, the isolators 24, 52 could be positioned in a clean room environment, while the high pressure pump 30 and the low pressure transfer pump 34 could be positioned in another room.

The system of the present disclosure is configured to be easily cleaned. Within the isolator 24, the first fluid is limited to the first side 26 of the isolator and the second fluid is limited to the second side 28 of the isolator, as discussed above. The first and second fluids do not come into direct contact. Thus, there is little concern of the first fluid contaminating the second fluid. However, it may be desirable to periodically clean the internal chamber of the isolator 24.

To allow easy cleaning of the isolator, the inlet ports 11 and 17 and outlet ports 13 and 15 are located at the distant end of the inside diameter of the isolator 24 and positioned in the vertical plane on both ends of the isolator 24.

Within the isolator 52, the first fluid is limited to the first side 56 of the isolator and the second fluid is limited to the second side 58 of the isolator, as discussed above. The first and second fluids do not come into direct contact. Thus, there is little concern of the first fluid contaminating the second fluid. However, it may be desirable to periodically clean the internal chamber of the isolator 52.

To allow easy cleaning of the isolator, the inlet ports 71, 77 and outlet ports 73, 75 are located at the distant end of the inside diameter of the isolator 52 and positioned in the vertical plane on both ends of the isolator 52.

The cross-sectional views of FIGS. 3-5 show the outlet port 13 being vertically above the inlet port 11 and the inlet port 17 being vertically above the outlet port 15 for isolator 24. The cross-sectional views of FIGS. 3-5 show the outlet port 73 being vertically above the inlet port 71 and the inlet port 77 being vertically above the outlet port 75 for isolator 52. Because of the relative positions of the inlet port 17 with respect to the outlet port 15, the isolator is configured to allow cleaning fluid to be pushed through check valve 16 through second sub-chamber 28 of the internal space 89 of the isolator 24 and purged out of check valve 14. Similarly, because of the relative positions of the inlet port 77 with respect to the outlet port 75, the isolator 52 is configured to allow cleaning fluid to be pushed through check valve 48 through the second sub-chamber 58 of the internal space 99 of the isolator 52 and purged out of check valve 44.

In some embodiments, to further clean the system, a source of cleaning fluid and a cleaning fluid pump are in fluid communication with the first check valve 16 and the first check valve 48. The manifold cleaning port 60 can be opened and the cleaning fluid pump can be activated to allow a large volume of cleaning fluid to be flushed through the isolators. In addition, the isolator pistons can be moved back and forth by activating valves 10, 12, 42, 43 to assist isolator cleaning.

FIG. 6 shows one embodiment of a system 600 according to the present disclosure where the proximity sensors 18, 20 and pressure sensors 32, 36 are connected to the controller 640 that is in communication with the high pressure shutoff valves 10, 43. The proximity sensors 18, 20 and the pressure sensors 32, 36 are connected to a server 620 through a network 610, which can be either wired or wireless. The server 620 includes a processor and a memory component that are configured to receive data from the sensors and to process the data from the sensors. The server 620 is in communication with the controller 640 through the network 610, and sends instructions to the controller 640 over the network 610. The controller 640 is configured to receive the instructions and to send signals that actuate the high pressure shut off valves 10, 43 either together (e.g., to entirely shut down the flow of the first fluid to the isolators) or individually in an alternating manner. A general purpose computer 630 is connected both to the server 610 and to the controller 640 through the network 610, and allows a user to interface with the controller 640 and the server 620. The controller 640 is also in communication with the discharge valve 80 to open/close it, and is communication with a heater or cooling unit 670. Other embodiments are possible. It is also possible to connect the proximity sensors 40, 46 of the second isolator 52 to the server.

In another aspect of the disclosure, the isolator 24 is provided alone, as shown in FIG. 2. In still other embodiments of the disclosure, the isolator 24 is provided without the valves 10,12,14,16.

In some embodiments, each isolator 24, 52 is contained in an insulating jacket and/or provided with a heating device and/or provided with a cooling device to provide temperature control of the isolator.

In some embodiments, each isolator 24, 52 contains an agitator to agitate the second fluid (the flowable product) where the second fluid is a multiphase mixture. The agitator keeps the multiphase mixture in suspension prior to exiting the isolator.

The isolator(s) 24, 52 and the pump 30 are separate modules within the system 200, and the system can be reconfigured with a different size isolator 24, 52, as well as a different size homogenizer valve (or other processing unit 70) to accommodate a drastic change in sample properties or intended application. The modular approach is useful for an industrial environment that processes diverse products for customers (e.g. toll processors).

Figure 7:
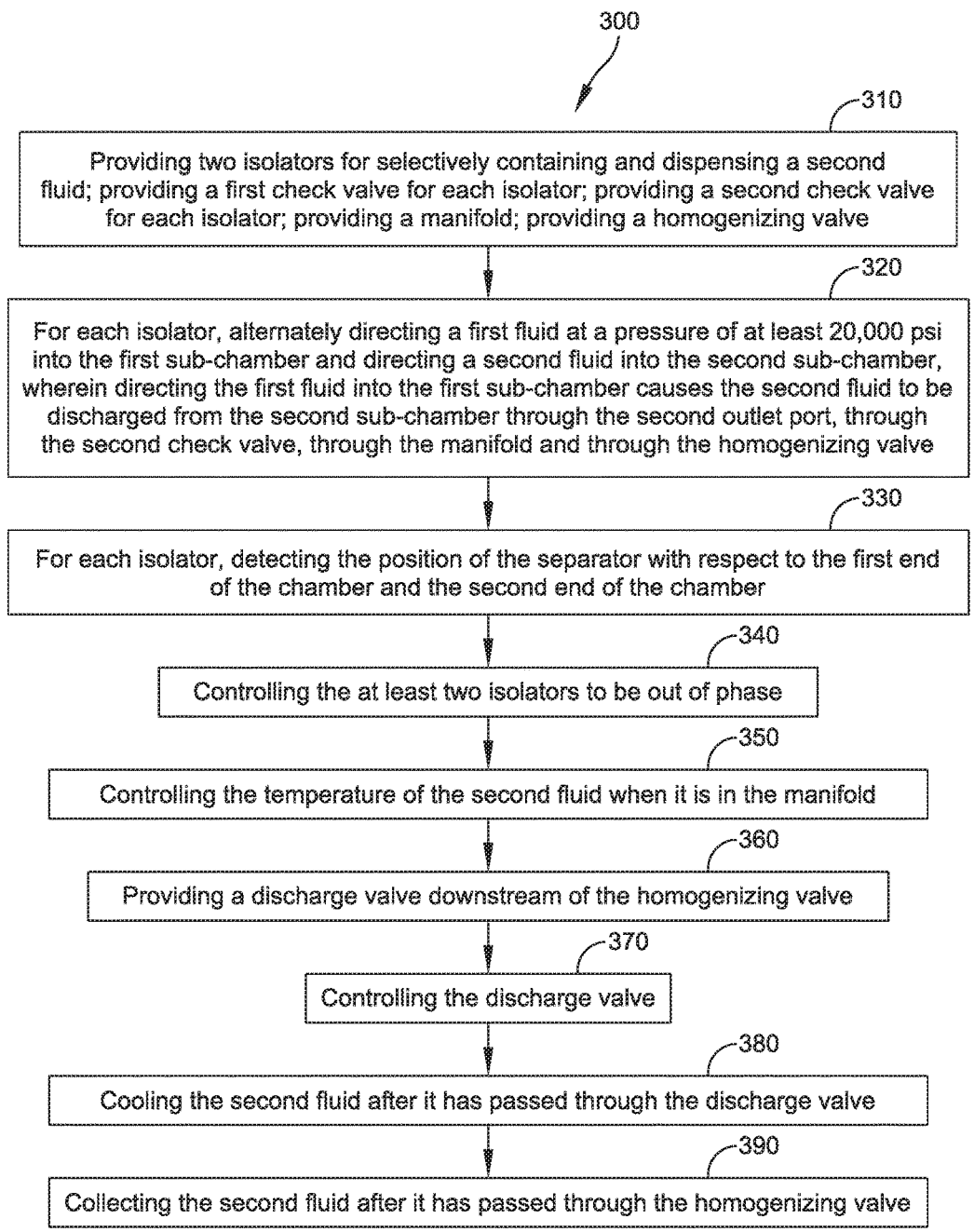
FIG. 7 is a block diagram of one embodiment of a method for high-pressure, high shear processing of fluids according to the present disclosure.

Another aspect of the present disclosure includes a method of high shear processing of a fluid. An exemplary embodiment of the method 300 is shown in FIG. 7.

In block 310, a user provides the system 200 as shown and described herein. Specifically, the user provides two isolators 24, 52 for selectively containing and dispensing a second fluid in response to pressure applied to the isolator piston 22 by the first fluid. The first isolator is an embodiment of the isolator 24 disclosed herein, such as an embodiment described in further detail above. The user also provides the first check valve 16 in fluid communication with the second inlet port 17. The first check valve 16 is configured to allow the second fluid to enter the second sub-chamber 28 through the second inlet port 17. The user also provides the second check valve 14 in fluid communication with the second outlet port 15. The second check valve 14 is configured to allow the second fluid to exit the second sub-chamber 28 (to exhaust from the second sub-chamber) through the second outlet port 15. The user also provides the manifold 100 in fluid communication with the second outlet port 15 by the second check valve 14. Additionally, the user provides a processing unit 70 in fluid communication with the manifold 100.

In block 320, the system is controlled to direct the first fluid at a pressure of at least 20,000 psi into the first sub-chamber 26 of the isolator 24 and to direct the second fluid into the second sub-chamber 28 of the isolator. Directing the first fluid into the first sub-chamber 26 causes the second fluid to be discharged from the second sub-chamber 28 through the second outlet port 15, through the second check valve 14, through the manifold 100 and through the processing unit 70. These components may be connected as shown and described above in relation to FIG. 1.

In block 330, the method detects the position of the isolator piston 22 (separator) of the isolator 24 with respect to the first end of the chamber of the isolator and with respect to the second end of the chamber of the isolator. As with the system 200 described above, two proximity sensors 18, 20 can be used, with the first sensor 20 being used to detect the position of the isolator piston with respect to the first end 83 of the isolator and the second sensor 18 being used to detect the position of the isolator piston with respect to the second end 85 of the isolator 24. These sensors can be included in one or more of the isolators.

It is possible to provide two isolators 24, 52 or more than two isolators. In block 310, a user provides the second isolator 52 in addition to the isolator 24 discussed in relation to block 310 above. Specifically, the user provides at least one isolator 52 for selectively containing and dispensing a second fluid in response to pressure applied to the isolator piston 50 by the first fluid. The isolator 52 is an isolator embodiment, such one described in further detail above. The user also provides the first check valve 48 in fluid communication with the second inlet port 77. The first check valve 48 is configured to allow the second fluid to enter the second sub-chamber 58 through the second inlet port 77. The user also provides the second check valve 44 in fluid communication with the second outlet port 75. The second check valve 44 is configured to allow the second fluid to exit the second sub-chamber 58 through the second outlet port 75.

The user also connects the manifold 100 to the second outlet port 75 via the second check valve 44.

In addition to the operation of the first isolator 24, in block 320, the system is controlled to alternately direct the first fluid at a pressure of at least 20,000 psi into the first sub-chamber 56 of the isolator 52 and to direct the second fluid into the second sub-chamber 58 of the isolator. Directing the first fluid into the first sub-chamber 56 causes the second fluid to be discharged from the second sub-chamber 58 through the second outlet port 75, through the second check valve 44, through the manifold 100 and through the processing unit 70. These components may be connected as shown and described above in relation to FIG. 1. The alternating filling of the first fluid into the isolators 24, 52 is performed in accordance with the out of phase description above in relation to FIGS. 4 and 5.

In block 330, the method detects the position of the isolator piston 50 (separator) of the isolator 52 with respect to the first end of the chamber of the isolator and with respect to the second end of the chamber of the isolator. As with the system 200 described above, two proximity sensors 40, 46 can be used, with the first sensor 40 being used to detect the position of the isolator piston with respect to the first end 93 of the isolator and the second sensor 46 being used to detect the position of the isolator piston with respect to the second end 95 of the isolator 52. These sensors can be included in one or more of the isolators.

In block 340, the two isolators 24, 52 are controlled to be out of phase. That is, the first fluid is first pumped into the first isolator 24, then the first shut off valve 10 is closed to prevent the first fluid from entering the first isolator 24 and the second shut off valve 43 is opened to allow the first fluid to be pumped into the second isolator 52. The alternating closing and opening of the first and second shut off valves 10, 43 causes the isolator pistons of the respective isolators to move out of phase. The out of phase movement of the isolator pistons 22, 50 facilitates a continuous flow of the second fluid through the manifold 100.

The steps in blocks 320, 330, and 340 may be performed simultaneously in some embodiments.

The method can include at least two isolators that are out of phase. The method can include additional isolators that are out of phase, as discussed above in relation to the system of the present disclosure.

In block 350, the controller 640 controls the temperature of the second fluid when it is in the manifold, after it has exited the isolators by controlling the heater or the cooling unit 670.

In block 360, the pressure discharge valve 80 is provided downstream of the homogenizing valve or other processing unit 70, and in block 370 the pressure discharge valve 80 is controlled by the controller 640 to reduce flow through the manifold 100 during the switchover process between isolators (when valves 10 and 43 are being throttled on and off) and to maintain a constant discharge pressure of the second fluid.

In block 380, the second fluid is cooled after it has passed through the pressure discharge valve 80.

In block 390, the second fluid is collected after it has passed through the homogenizing valve or other processing unit 70, and after the cooling step of block 380 has been performed. For example, the second fluid can be directed into individual containers, such as bottles, vials, etc. at a collection zone 90.

In other embodiments of the method, only one isolator 24 is provided.

Embodiments are not limited in their application to the details of construction and the arrangement of components set forth in the following description or illustrated in the drawings. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A method of high pressure, high shear processing of a fluid, the method comprising the steps of:
   providing at least one isolator for selectively containing and discharging a second fluid, the at least one isolator further including
   an isolator wall defining a chamber,
   a separator positioned in the chamber and movable between a first end of the chamber and a second end of the chamber, the separator engaging the isolator wall to further divide the chamber into a first sub-chamber and a second sub-chamber that are in pressure communication with each other but are not in fluid communication with each other,
   a first sub-chamber inlet valve in fluid communication with an ultrahigh pressure pump and the first sub-chamber,
   a first sub-chamber outlet valve in fluid communication with the first sub-chamber,
   a first check valve in fluid communication with the second sub-chamber to allow fluid to enter the second sub-chamber, and
   a second check valve in fluid communication with the second sub-chamber to exhaust fluid from the second sub-chamber;
   providing a processing unit in fluid communication with the second check valve of the at least one isolator;
   alternately directing a first fluid at a pressure of at least 20,000 psi into the first sub-chamber and directing the second fluid into the second sub-chamber, wherein directing the first fluid into the first sub-chamber causes the second fluid to be discharged from the second sub-chamber, through the second check valve, and through the processing unit; and
   controlling a temperature of the second fluid when it is in a manifold that is in fluid communication with the second check valve.

2. The method of claim 1, wherein the step of providing at least one isolator includes a step of providing two isolators.

3. The method of claim 2, wherein each of the two isolators discharge the second fluid out of phase to provide a continuous flow of the second fluid through the manifold.

4. The method of claim 3, further comprising the steps of detecting a position of the separator with respect to the first end of the chamber and the second end of the chamber, and
   controlling the two isolators to be out of phase.

5. The method of claim 1, further comprising the step of collecting the second fluid after it has passed through the processing unit.

6. The method of claim 1, further comprising the steps of providing a pressure discharge valve downstream of the processing unit, and controlling the pressure discharge valve.

7. The method of claim 6, further comprising the step of cooling the second fluid after it has passed through the pressure discharge valve.

8. A high fluid shear processing system comprising:
   an ultrahigh pressure pump capable of advancing a first fluid at a pressure of at least 20,000 psi; and
   at least one isolator for selectively containing and discharging a second fluid, the at least one isolator including
   an isolator wall defining a chamber,
   a separator positioned in the chamber and movable between a first end of the chamber and a second end of the chamber, the separator engaging the isolator wall to further divide the chamber into a first sub-chamber and a second sub-chamber that are in pressure communication with each other but are not in fluid communication with each other,
   a first sub-chamber inlet valve in fluid communication with the ultrahigh pressure pump and the first sub-chamber,
   a first sub-chamber outlet valve in fluid communication with the first sub-chamber,
   a first check valve in fluid communication with the second sub-chamber to allow fluid to enter the second sub-chamber, and
   a second check valve in fluid communication with the second sub-chamber to exhaust fluid from the second sub-chamber; and
   a processing unit in fluid communication with the second check valve, wherein the processing unit is a homogenizing valve.

9. The system of claim 8, wherein the at least one isolator includes two isolators, the two isolators being configured so that while a first isolator is filling, a second isolator is discharging.

10. The system of claim 8, wherein the at least one isolator further includes a first proximity sensor to detect a proximity of the separator to the first end of the chamber, and a second proximity sensor to detect a proximity of the separator to the second end of the chamber.

11. The system of claim 8, further comprising a low pressure transfer pump in fluid communication with the first check valve, the low pressure transfer pump being configured to advance the second fluid to the first check valve.

12. The system of claim 8, further comprising a manifold pressure sensor connected to a manifold that is in fluid communication with the second check valve.

13. The system of claim 8, further comprising a pump pressure sensor connected to the ultrahigh pressure pump.

14. The system of claim 8, further comprising a temperature controlled zone downstream of the processing unit.

15. The system of claim 9, a controllable pressure discharge valve in fluid communication with the second check valve of each isolator, the controllable pressure discharge valve being downstream of the processing unit.

16. The system of claim 8, wherein the at least one isolator further includes a vent in fluid communication with the second sub-chamber of the at least one isolator, the vent being configured to allow clean in place operation of the system.

17. The system of claim 15, further comprising
a processor,
- at least one discharge pressure sensor in communication with the processor, the at least one discharge pressure sensor being configured to measure a discharge pressure at the pressure discharge valve; and
- a controller in communication with the processor, the controller being configured to throttle the pressure discharge valve to reduce flow during a switchover process between isolators, thereby maintaining the discharge pressure at a constant level.

18. The system of claim 8, wherein the at least one isolator and a pressure discharge valve can be maintained at a preselected temperature by at least one of insulation and secondary heating.

* * * * *